United States Patent
Miyako

(10) Patent No.: US 8,872,769 B2
(45) Date of Patent: Oct. 28, 2014

(54) HAPTIC INPUT DEVICE

(75) Inventor: Ikuyasu Miyako, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 259 days.

(21) Appl. No.: 13/345,025

(22) Filed: Jan. 6, 2012

(65) Prior Publication Data

US 2012/0176319 A1 Jul. 12, 2012

(30) Foreign Application Priority Data

Jan. 6, 2011 (JP) ................................ 2011-000951

(51) Int. Cl.

| | |
|---|---|
| G06F 3/033 | (2013.01) |
| G06F 3/0481 | (2013.01) |
| G06F 3/0354 | (2013.01) |
| G06F 3/01 | (2006.01) |
| G06F 3/038 | (2013.01) |

(52) U.S. Cl.

CPC ............ *G06F 3/016* (2013.01); *G06F 3/04812* (2013.01); *G06F 3/03549* (2013.01); *G06F 3/038* (2013.01)

USPC .......................................... 345/167; 345/157

(58) Field of Classification Search

None
See application file for complete search history.

(56) References Cited

U.S. PATENT DOCUMENTS

| | | | | |
|---|---|---|---|---|
| 5,973,670 A | * | 10/1999 | Barber et al. ................. | 345/157 |
| 2005/0259076 A1 | * | 11/2005 | Hayasaka et al. ............. | 345/161 |
| 2009/0073125 A1 | * | 3/2009 | Anastas et al. ................ | 345/167 |
| 2011/0083089 A1 | * | 4/2011 | Pahud et al. .................. | 715/765 |
| 2012/0005058 A1 | * | 1/2012 | Buck .............................. | 705/37 |

FOREIGN PATENT DOCUMENTS

JP 08-314637 11/1996

* cited by examiner

*Primary Examiner* — Dwayne Bost
*Assistant Examiner* — Maheen Javed
(74) *Attorney, Agent, or Firm* — Brinks Glison & Lione

(57) ABSTRACT

A distance vector from the original cursor position where the cursor exists before the manipulation to the cursor movement destination position is set to a movement direction distance vector, distance vectors from the original cursor position to each button position of a plurality of buttons are set to button distance vectors, and the button having the shortest movement time is determined as a target button intended by a user by computing the movement time to a plurality of buttons using the movement direction distance vector and a plurality of button distance vectors, so that the display control of the display unit is performed such that the cursor is dragged into the target button.

3 Claims, 8 Drawing Sheets

HAPTIC INPUT DEVICE

CLAIM OF PRIORITY

This application claims benefit of Japanese Patent Application No. 2011-000951 filed on Jan. 6, 2011, which is hereby incorporated by reference in its entirety.

BACKGROUND

1. Field of the Disclosure

The present disclosure relates to a haptic input device used in, for example, a car navigation system and the like, and more particularly, to a method of improving operability in a haptic input device capable of automatically dragging a cursor into a menu selection button displayed on display means to make it easier to select a desired button.

2. Description of the Related Art

In the related art, a display device that facilitates selection of a desired button by automatically dragging the cursor into the displayed menu selection button is used as a display means in a car navigation system and the like.

As a first example of the related art, Japanese Unexamined Patent Application Publication No. 8-314637 proposes an image display device in which a virtual drag area is established around the button, and the cursor is dragged into the center position of the button by manipulating an input device such as a joystick or a mouse in order to facilitate positioning of the cursor into the button displayed in the display device.

In the method of dragging the cursor in the image display device, as shown in FIG. 7, when a movement input is received using the cursor displacement input means 811, it is determined whether or not the present cursor display position stored in the cursor position storing means 815 is included in one of the drag areas set in the component table 814 in advance. If it is determined that the present cursor display position is included in the drag area, the drag vector computation means 813 computes a drag vector based on a drag center position of the drag area and the present cursor display position. In addition, the cursor display position computation means 812 determines the display position of the cursor based on information obtained from the cursor displacement input means 811, the drag vector computation means 813, and the cursor position storing means 815, and the position thereof is transmitted to the display device 816, so as to move the cursor.

As a second example of the related art, Japanese Unexamined Patent Application Publication No. 2005-332325 discloses a haptic input device as an input device for controlling movement of the cursor, including: a manipulation unit manipulated by a user; detection means that detects a manipulation state of the manipulation unit; drive means that exerts a drive force to the manipulation unit; display means that displays the cursor and a plurality of buttons; and control means that performs drive control of the drive means and display control of the display means.

The haptic input device disclosed in Japanese Unexamined Patent Application Publication No. 2005-332325 uses a manipulation unit having a pivot lever that can be pivoted and has two detection means for detecting a manipulation amount in two perpendicular directions of the pivot lever, such as a rotary type encoder or a variable resistor. In addition, the haptic input device has, for example, a liquid crystal display device as display means for displaying a desired image including a plurality of buttons and the cursor using two drive means such as an electric motor for exerting a drag force to the manipulation unit through a pivot lever. This technique allows a user to easily select a desired button, and provides a haptic input device capable of obtaining excellent operability and a sense of manipulation.

As disclosed in Japanese Unexamined Patent Application Publication Nos. 8-314637 and 2005-332325, typically, a plurality of buttons are displayed on the display means in various array forms as shown in FIG. 8. However, the configuration of Japanese Unexamined Patent Application Publication No. 8-314637 fails to consider drag control of the cursor in a case where drag areas established for each of a plurality of buttons are overlappingly combined. Therefore, when the technique of Japanese Unexamined Patent Application Publication No. 8-314637 is applied to a practical apparatus, the cursor may be erroneously dragged into the button unintended by a user.

That is, as shown in FIG. 8, for example, when manipulation S92 is performed to move the cursor (the cursor C94 as a movement destination) to the button B94 intended by a user from the button B91 where the crisscross cursor C91 presently exists, the cursor is dragged into the button B92 because manipulation is made to drag the cursor into the drag area A92 (the dragged cursor is C92). For example, in a case where manipulation S93 is performed such that the cursor is moved to the area where the drag area A93 of the button B93 and the drag area A94 of the button B94 are overlappingly combined, the drag vector from the cursor to the center position of the button B93 is smaller than the drag vector from the cursor to the center position of the button B94. Therefore, the cursor movement is controlled such that the cursor is dragged into the button B93 (the dragged cursor is C93). However, since a user desires to move the cursor C91 to the button B94, if the cursor is dragged into the button B92 or B93, a user senses an uncomfortable feeling in the manipulation, and it is difficult to smoothly manipulate the manipulation unit.

SUMMARY

According to an aspect of the invention, there is provided a haptic input device including: a manipulation unit manipulated by a user; a detection mechanism that detects a manipulation state of the manipulation unit; a drive mechanism that exerts a drive force to the manipulation unit; a display that displays a cursor and a plurality of buttons; and control unit that performs display control of the cursor based on an output signal of the detection mechanism and drive control of the drive mechanism, wherein, when the output signal of the detection mechanism is received by manipulating the manipulation unit, a distance vector from an original cursor position where the cursor exists before the manipulation to a cursor movement destination position where the cursor moves after the manipulation is set to a movement direction distance vector, a distance vector from the original cursor position to each button position of a plurality of buttons is set to a button distance vector, and the control means computes the movement direction distance vector and each button distance vector, computes movement times to a plurality of the buttons using the movement direction distance vector and a plurality of the button distance vectors, and determines a button having the shortest movement time as a target button intended by a user, so as to perform display control to drag the cursor into the target button.

DESCRIPTION OF THE EXEMPLARY EMBODIMENTS

Hereinafter, embodiments of the invention will be described in detail with reference to the accompanying drawings.

First Embodiment

Figure 1:
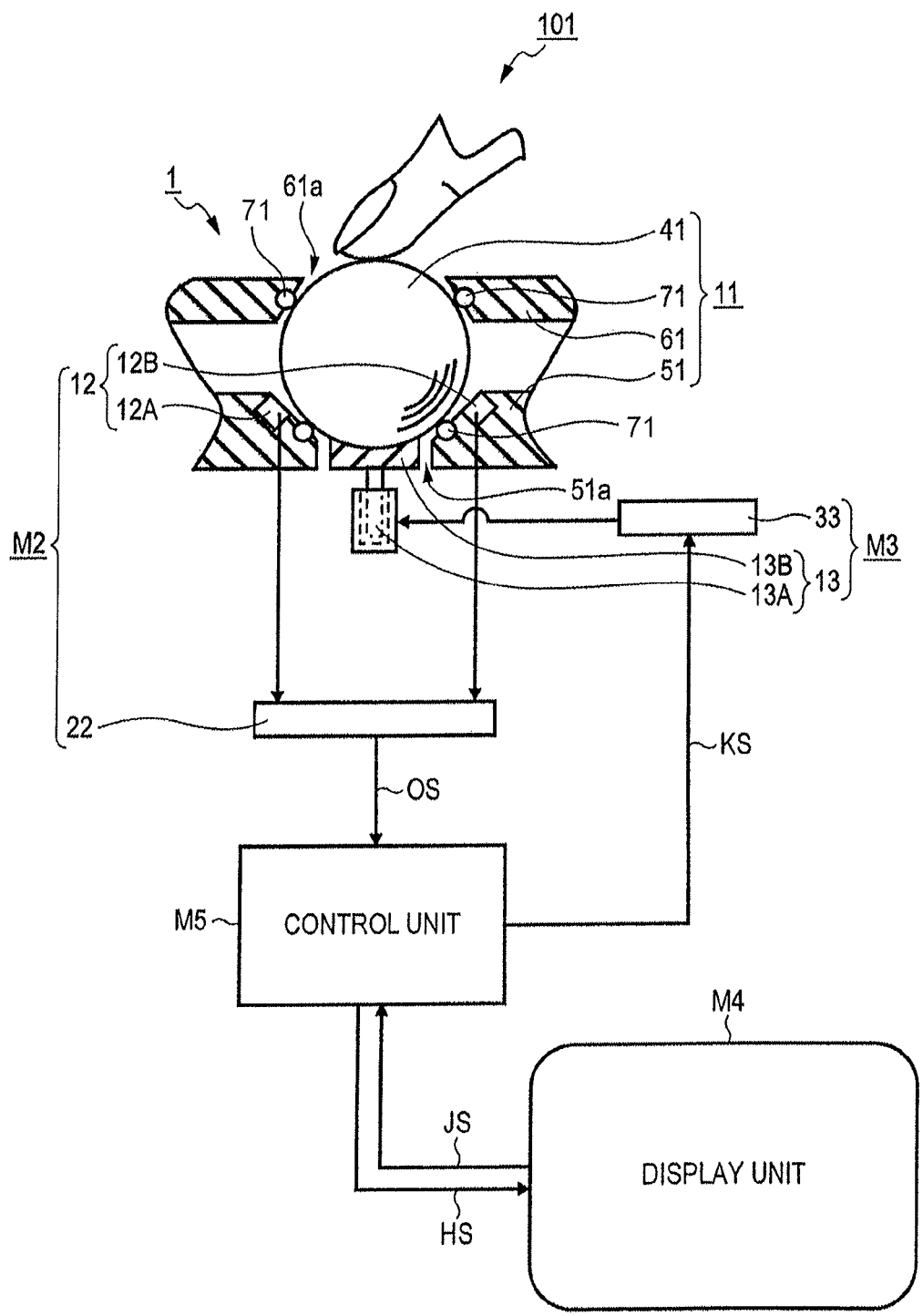
FIG. 1 is a configuration diagram illustrating a configuration of the haptic input device according to a first embodiment of the invention.
Figure 2A:
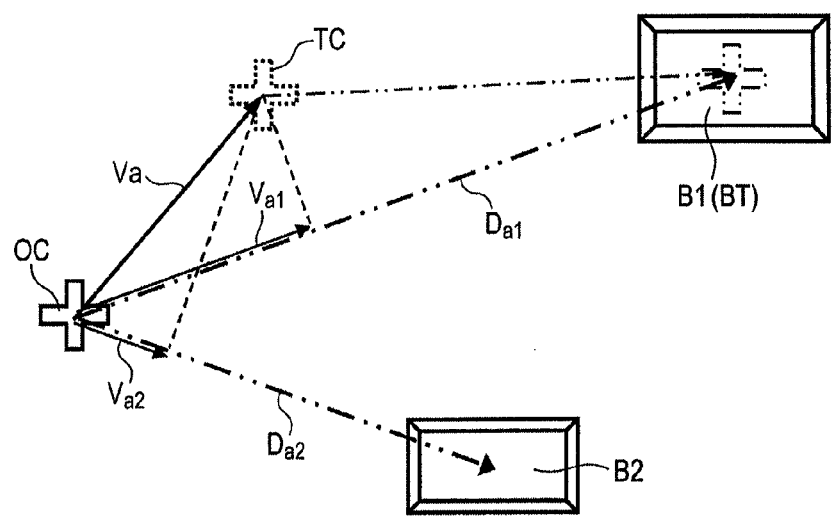
FIGS. 2A and 2B are configuration diagrams illustrating an exemplary control operation of the control unit in the haptic input device according to a first embodiment of the invention.
Figure 2B:
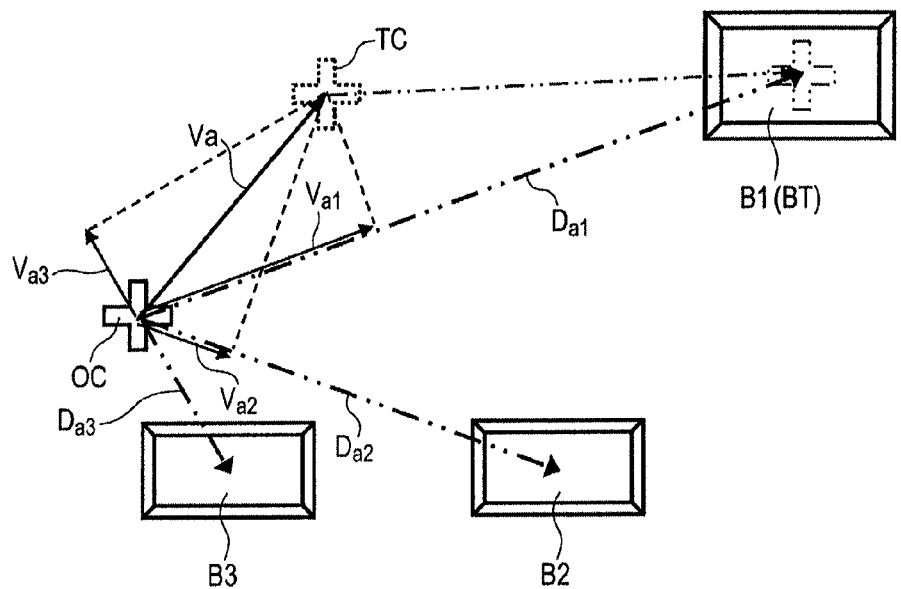

FIG. 1 is a configuration diagram illustrating a haptic input device 101 according to a first embodiment of the invention. FIGS. 2A and 2B are schematic diagram illustrating an exemplary control operation of the control unit M5 in the haptic input device 101 according to a first embodiment of the invention. FIG. 2A illustrates control operation using one cursor and two buttons, and FIG. 2B illustrates control operation using one cursor and three buttons.

Referring to FIG. 1, the haptic input device 101 according to the first embodiment of the invention mainly includes a manipulation unit 1 manipulated by a user, a detection unit M2 that detects a manipulation status of the manipulation unit 1, a drive unit M3 that applies a drive force to the manipulation unit 1, a display unit M4 that displays a cursor and a plurality of buttons, and a control unit M5 that performs display control of the cursor based on the output signal OS of the detection unit M2 and performs drive control of the drive unit M3.

The manipulation unit 1 is constructed using a so-called trackball 11, which is an input device for receiving a manipulation input from a user as shown in FIG. 1. The trackball 11 is capable of performing input manipulation using a simple mechanism with low cost unlike the manipulation unit having a drive device of the example 2 of the related art. The trackball 11 includes, for example, a resin ball body 41, a base body 51, a cover member 61, and a contact portion 71 to rotatably support the ball body 41. The base body 51 and the cover member 61 are plate-shaped members having a corresponding thickness, and are arranged substantially in parallel to each other. The base body 51 is connected to, for example, a casing of a computer or the like, or is fixed to an instrument panel in the case of a vehicle-mounted electric component.

Although FIG. 1 illustrates only a cross-sectional view of the configuration of the manipulation unit 1, the base body 51 is provided with a circular thru-hole 51a in a thickness direction, and the cover member 61 is also provided with a circular thru-hole 61a in a thickness direction as seen in a top view.

The thru-hole 61a is tapered to be narrowed from the bottom to the top surface of the cover member 61 so that it is possible to prevent a dropout of the ball body 41 and expose a part of the surface of the ball body 41 to the top surface side of the cover member 61. In this exposed portion, a user is allowed to manipulate the ball body 41.

A contact portion 71 is, for example, a resin or metal spherical body having a diameter smaller than the ball body 41, and is partially buried in and fixed to the base body 51 and the cover member 61. In addition, a plurality of contact portions 71 (for example, 6 to 8) are provided to supportably abut on the ball body 41 to allow the ball body 41 to rotatably move.

The detection unit M2 is a unit for detecting a manipulation state of the manipulation unit 1. As shown in FIG. 1, the detection unit M2 includes a sensor unit 12 and an output unit 22. The sensor unit 12 is disposed to be buried in the base body 51 using two optical sensors 12A and 12B. The sensors 12A and 12B are a device capable of irradiating detection light (not shown) onto the surface of the ball body 41, receiving (or capture an image of) the reflected light thereof, and detecting the movement of the surface of the ball body 41 (movement direction and movement amount) in real time. In addition, the detection signal of the sensors 12A and 12B are input to the output unit 22 and output to the control unit M5 as an output signal OS.

The drive unit M3 is a unit for exerting a drive force to the manipulation unit 1. As shown in FIG. 1, as the drive unit M3, a so-called electromagnetic brake 13 having an actuator 13A and a friction member 13B is used. The electromagnetic brake 13 is capable of exerting a drive force using a simple mechanism with low costs and suppressing power consumptions to be low, unlike a drive device using an electric motor and the like such as that described in the example 2 of the related art. The drive unit M3 further includes an input unit 33 that receives a drive signal KS for drive control from the control unit M5. The friction member 13B is disposed under the ball body 41, and a concave portion having a spherical hallow matching with the surface shape of the ball body 41 is provided on an upper surface thereof. The actuator 13A serves as a drive source such as a linear solenoid, and is provided with the friction member 13B in the leading edge of the plunger thereof.

The actuator 13A receives the drive signal KS and increases the pressure output of the plunger by flowing electricity so that the friction member 13B can be strongly pressed to the surface of the ball body 41. When the friction member 13B is strongly pressed to the surface of the ball body 41, the ball body 41 is forced not to move temporarily. Therefore, a user obtains a tactile sense (haptic stimulation) of being blocked by an obstacle, and the sense of manipulation is improved through the ball body 41. In addition, since a noisy metallic sound is generated using impact of strongly pressing the friction member 13B to the surface of the ball body 41, a user also obtains a sense of manipulating the button (audible stimulation) from this sound, and the sense of manipulation is improved.

In addition, the actuator 13A is not turned on at the normal time when the drive signal KS is not received, and the pressure output of the plunger is set to zero (released) to slightly separate the friction member 13B from the surface of the ball body 41 or is slightly turned on to reduce the pressure output of the plunger, so that the friction member 13B marginally makes contact with the surface of the ball body 41.

The display unit M4 is a unit for displaying a cursor and a plurality of buttons and is constructed of, for example, a liquid crystal display device. In addition, the display unit M4 receives a display signal HS for display control from the control mean M5 as shown in FIG. 1 and performs display of the cursor, display of movement of the cursor or operation for dragging the cursor into the center position of the button, and the like. In addition, the display unit M4 also outputs a status signal JS regarding the status of the cursor and a plurality of buttons to the control unit M5. In addition, the coordinates of the cursor and the buttons are determined such that the horizontal direction of the display unit M4 is set to an X axis, and the vertical direction is set to a Y axis.

The control unit M5 is a unit for performing display control of the cursor based on the output signal OS of the detection unit M1 and performing drive control of the drive unit M3. The control unit M5 mainly includes: a computation unit that computes the movement direction of the cursor, the movement amount, the drive signal KS of the drive unit M3, and the like; a storage unit that stores equations or coefficients used as a basis of the computation, coordinates of the centers of each button, the position of the cursor, and the like; a display control unit including an input mechanism that receives the status signal JS from the display unit M4, a drive circuit unit that outputs the display signal HS for display control to drive the display unit M4, and the like; a drive control unit including a drive circuit unit that outputs the drive signal KS for drive control to drive the drive unit M3; and a central processing unit (CPU) that controls each of the aforementioned units.

Next, an exemplary control operation of the control unit M5 will be described with reference to FIGS. 2A and 2B.

In the computation unit of the control unit M5, when the manipulation unit 1 is manipulated, and the output signal OS of the detection unit M2 is received, as shown in FIG. 2A, a distance vector from the original cursor position OC where the cursor is located before the manipulation to the cursor movement destination position TC is set to a movement direction distance vector Vn, and a distance vector from the original cursor position OC to each button position of a plurality of buttons is set to a button distance vector Dn, in order to compute the movement direction distance vector Vn and each button distance vector Dn. The n of Vn denotes the (n)th movement, and the movement direction vector computed in the (n)th time is denoted by Vn. In addition, the distance vectors from the original movement cursor position OC before the (n)th movement to each button position of a plurality of buttons are collectively called a button distance vector Dn. That is, in FIG. 2A, the movement direction distance vector Vn is set to the movement direction distance vector Va of the movement performed in the (a)th time. In addition, the button distance vector Dn is set to the button distance vector Da (not shown) before the (a)th movement, the button distance vector to the position of the button B1 is denoted by $D_{a1}$, and the button distance vector to the position of the button B2 is denoted by $D_{a2}$, so that computation is performed for each button.

The movement direction distance vector Vn represents a sum of the distance vectors obtained when the manipulation unit 1 is manipulated within a certain time to move the cursor, and is computed using an equation Vn=Vx+iVy. Similarly, the button distance vector Dn is computed using an equation Dn=Dx+iDy. The coefficient i represents the imaginary unit of a complex number.

The computation unit of the control unit M5 defines the movement time Tn to the button as an equation Tn=|Dn|÷|Vs| to compute the movement time using the button distance vector Dn and the projection component Vs to the button distance vector Dn of the movement direction distance vector Vn. In addition, the projection component Vs is a projection component of the movement direction vector Vn computed in the (n)th time and is computed for each button. That is, in FIG. 2A, for the projection component Vs of the movement direction distance vector Va computed in the (a)th time, the projection component corresponding to the button distance vector $D_{a1}$ of the button B1 is denoted by $V_{a1}$, and the projection component corresponding to the button distance vector $D_{a2}$ of the button B2 is denoted by $V_{a2}$.

The control unit M5 performs display control such that the cursor is dragged into the target button BT by determining that the button having the shortest movement time to the button is the target button BT intended by a user. For example, in the example of FIG. 2A, if the movement time MT1=|$D_{a1}$|÷|$V_{a1}$| to the button B1 is compared with the movement time MT2=|$D_{a2}$|÷|$V_{a2}$| to the button B2, the movement time MT1 is shorter than the movement time MT2. Therefore, the button B1 far from the original cursor position OC is determined as the target button BT. In addition, if the equations are appropriately rearranged, the movement time MT1 to the button B1 is computed as MT1=($Dx_1^2$+$Dy_1^2$)÷(Vx×$Dx_1$+Vy×$D_1$). In this manner, the movement time MT1 can be computed only using four fundamental rules of arithmetic without any square root computation. Therefore, it is advantageous in a built-in type CPU in which processing time is restricted.

However, as shown in FIG. 2B, if an angle between the center direction of the button B3 and the direction of the cursor movement destination position TC is between 90° and 180°, the projection component $V_{a3}$ has an inverse direction (minus) to the button distance vector $D_{a3}$. Therefore, the projection component $V_{a3}$ is excluded from the buttons used to compare the movement time.

As a result, the haptic input device 101 of the present invention computes the movement time Tn to each button using the movement direction distance vector Vn from the original cursor position OC before the manipulation to the cursor movement destination position TC and the button distance vector Dn from the original cursor position OC to each button positions of a plurality of buttons. In addition, the movement times to each button are compared with each other, and the button computed to have the shortest movement time out of those buttons is determined as a target button BT intended by a user, so that the display control is performed to drag the cursor into the target button BT. Therefore, the cursor does not simply move to the neighboring button, but the cursor can be reliably dragged into the button intended by a user.

Figure 3:
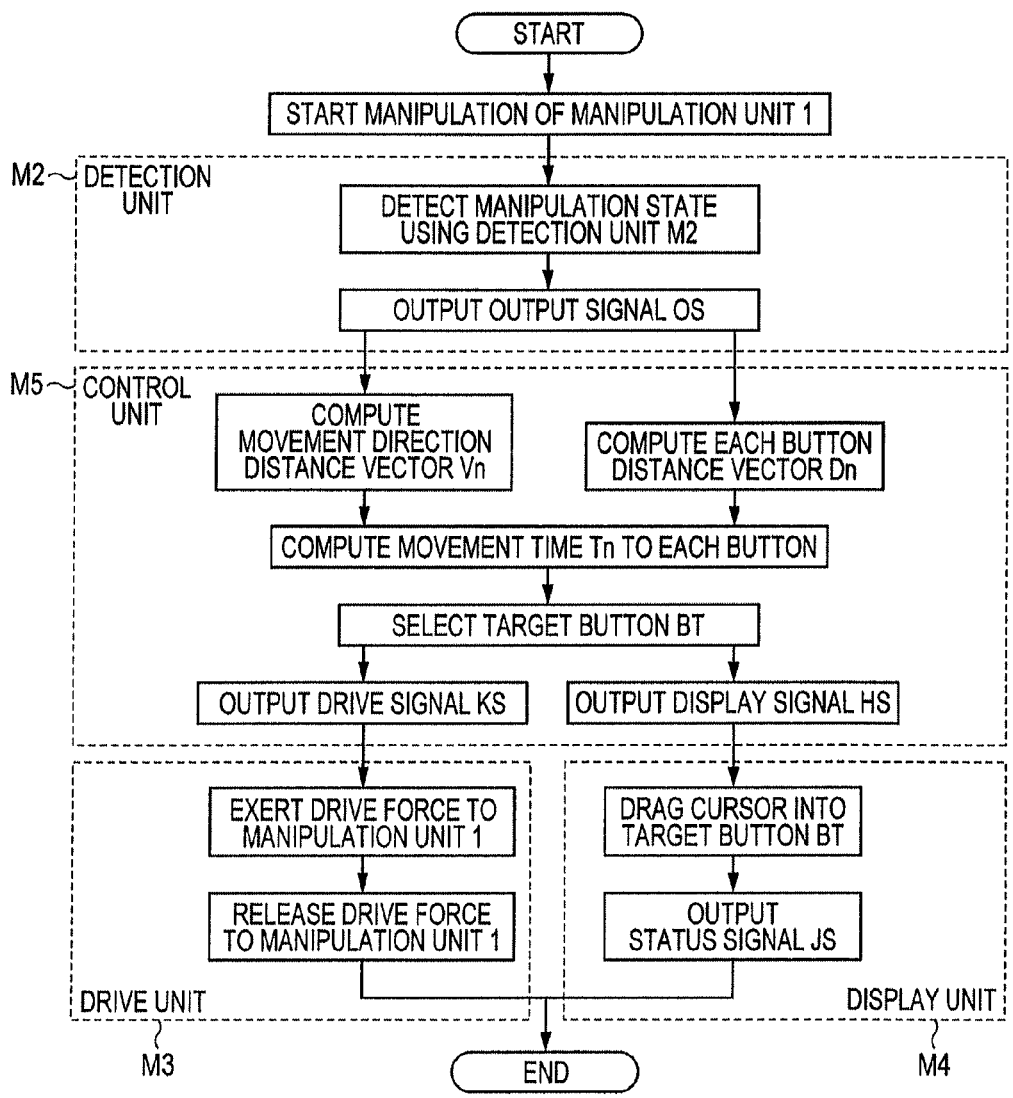
FIG. 3 is a flowchart illustrating a control method in the haptic input device according to a first embodiment of the invention.

FIG. 3 is a flowchart illustrating a control method in the haptic input device 101 according to the first embodiment of the invention by collectively using the aforementioned method. Referring to FIG. 3, first, as the manipulation unit 1 is manipulated, the detection unit M2 detects a manipulation state of the manipulation unit 1 and outputs the output signal OS to the control unit M5.

Then, the control unit M5 receives the output signal OS and computes the movement direction distance vector Vn based on the output signal OS regarding the manipulation state and the cursor position information from the storage unit, and the like and each button distance vector Dn based on the button position information, the cursor position information from the storage unit, and the like. In addition, the control unit M5 computes the movement time Tn to each button using the movement direction distance vector Vn and each button distance vector Dn, compares the movement time of each button, and determines and selects the button computed to have the shortest movement time as the target button BT intended by a user out of the buttons. In this case, the cursor movement destination position is recorded in the storage unit.

Then, the control unit M5 transmits the display signal HS to the display unit M4 for display control to drag the cursor into the target button BT and the drive signal KS for drive control of the drive unit M3 when the cursor is dragged into the target button BT.

Finally, the display unit M4 receives the display signal HS for display control from the control unit M5 and drags the cursor into the center position of the target button BT and outputs the cursor state as the status signal JS to the storage unit of the control unit M5.

In addition, the drive unit M3 receives the drive signal KS for drive control from the control unit M5 to exert a drive force to the manipulation unit 1 when the cursor is dragged into the target button BT. A noisy metallic sound is generated as the drive force is exerted. For this reason, a user obtains a tactile sense (haptic stimulation) of being blocked by an obstacle and a sense of manipulating the button (audible stimulation) through the sound, so that the sense of manipulation is improved.

As a result, in the haptic input device 101 of the invention, the movement time Tn to each button is computed using the movement direction distance vector Vn from the original cursor position OC before the manipulation to the cursor movement destination position TC and the button distance vector Dn from the original cursor position OC to each button position of a plurality of buttons. The movement times of each button are compared with each other, and the button computed to have the shortest movement time is determined as the target button BT intended by a user out of those buttons, so that display control is performed to drag the cursor into the target button BT. Therefore, the cursor is not simply moved to the neighboring button, but the cursor can be reliably dragged into the button intended by a user.

When the cursor is dragged into the target button BT, a drive force is exerted to the manipulation unit 1, and a sound is generated so that both a tactile sense (haptic stimulation) of being blocked by an obstacle and a sense of manipulating the button (audible stimulation) are provided to a user through the sound. Therefore, a user's sense of manipulation is improved.

In addition, the trackball 11 is used in the manipulation unit 1, and the electromagnetic brake 13 is used in the drive unit M3. Therefore, it is possible to obtain both the haptic stimulation and the audible stimulation using a simple mechanism with low cost.

Second Embodiment

Figure 4:
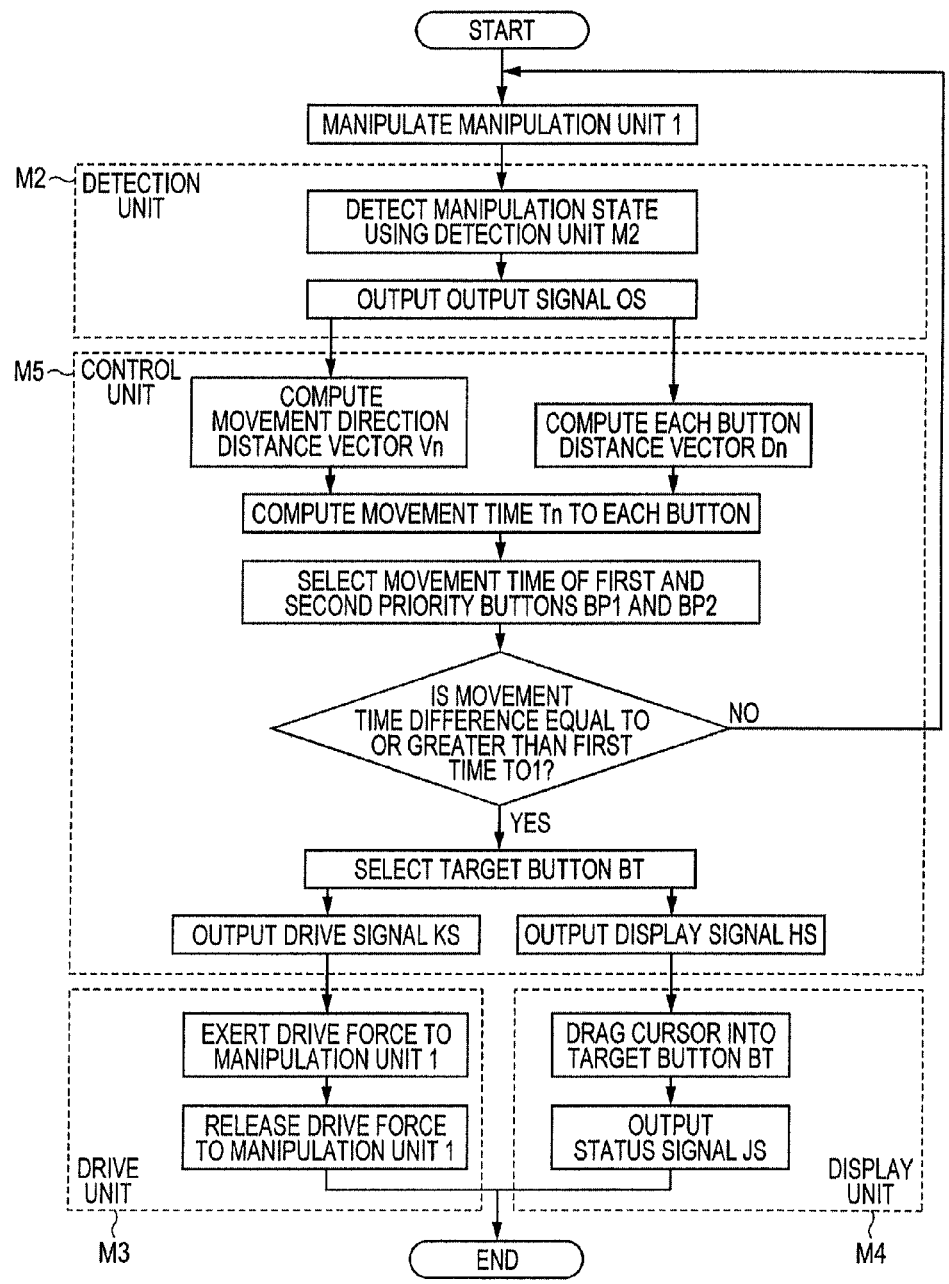
FIG. 4 is a flowchart illustrating a control method in the haptic input device according to a second embodiment of the invention.
Figure 5:
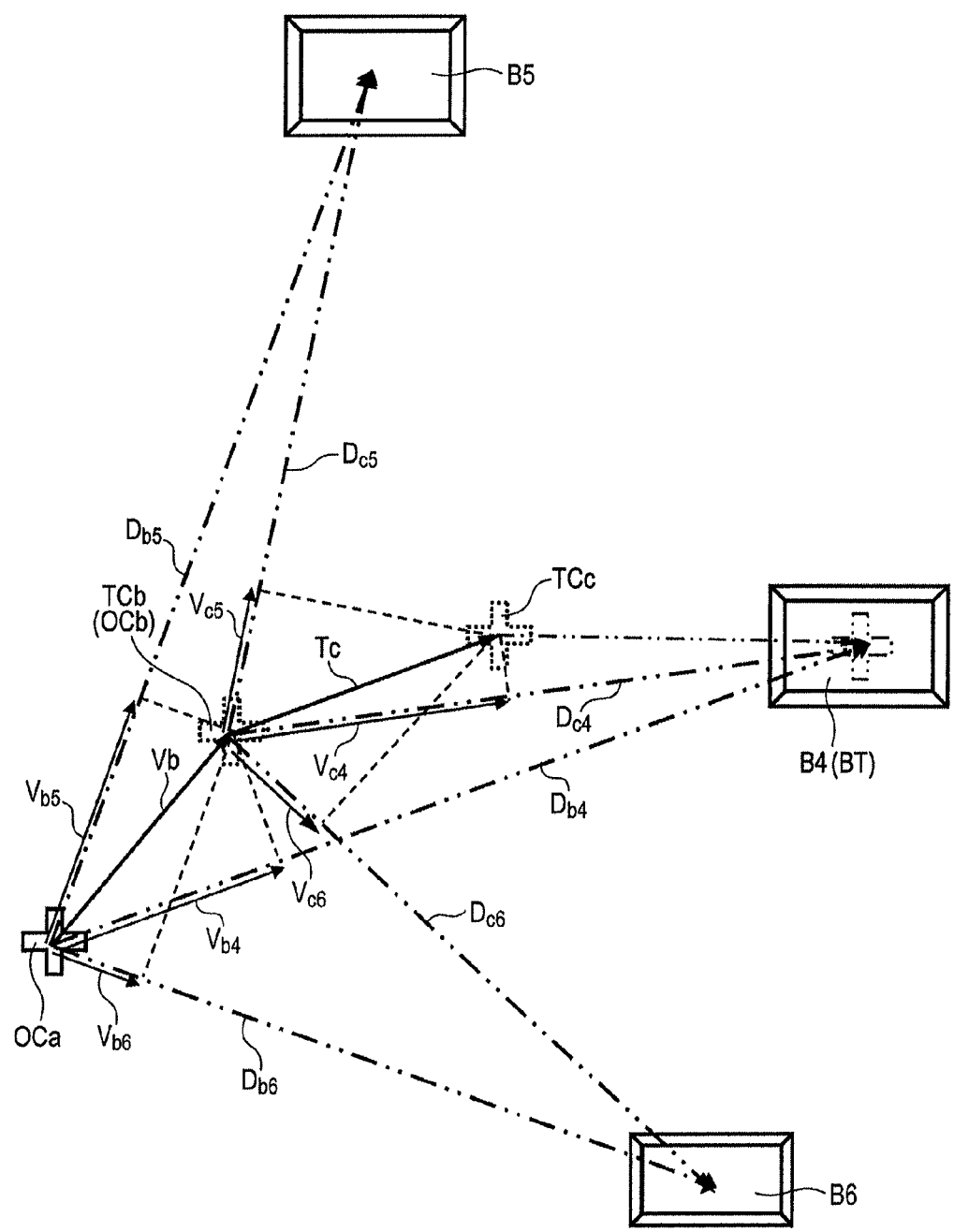
FIG. 5 is a configuration diagram illustrating an exemplary control operation of the control unit in the haptic input device according to a third embodiment of the invention.

FIG. 4 is a flowchart illustrating a control method in the haptic input device 102 according to the second embodiment of the invention. FIG. 5 is a schematic diagram illustrating an exemplary control operation of the control unit M5 in the haptic input device 102 according to the second embodiment of the invention. The haptic input device 102 according to the second embodiment of the invention is different from the haptic input device 101 according to the first embodiment of the invention in the control method. In the second embodiment, like reference numerals denote like elements as in the first embodiment, and description thereof will not be repeated.

In the control method of the haptic input device 102 according to the second embodiment of the invention, first, as shown in FIG. 3 as the manipulation unit 1 is manipulated, the detection unit M2 detects a manipulation state of the manipulation unit 1, and outputs the output signal OS to the control unit M5.

Then, the control unit M5 receives the output signal OS, computes the movement direction distance vector Vn based on the cursor position information from the storage unit, the output signal OS of the manipulation state, and the like, and computes each button distance vector Dn based on the cursor position information from the storage unit, the button position information, and the like. The movement times Tn to each button are computed using the movement direction distance vector Vn and each button distance vector Dn, and the movement times of each button are compared with each other, so that the button having the shortest computed movement time is set to a first priority button PB1, and the button having the next shortest computed movement time is set to a second priority button PB2. In this case, the cursor movement destination position is recorded in the storage unit.

Then, the control unit M5 determines and selects the first priority button BP1 as the target button BT in a case where the movement time difference between the movement time of the first priority button BP1 and the movement time of the second priority button BP2 is equal to or larger than a predetermined first time T01. However, in a case where the movement time difference is not equal to or larger than a predetermined first time T01, the target button BT is not selected, the cursor dragging manipulation is not performed, and manipulation of the manipulation unit 1 is awaited.

If the manipulation unit 1 is manipulated again, the movement times Tn to each button are computed in the same order, and it is determined whether or not the movement time difference between the movement time of the first priority button BP1 and the movement time of the second priority button PB2 is equal to or larger than a predetermined first time T01. Then, the target button BT is selected by repeating this sequence. However, in a case where the movement times Tn to each button are computed, the position of the cursor manipulated at the previous time and recorded in the storage unit is computed as the original cursor position OC, and the position of the cursor manipulated in this time is computed as the cursor movement destination position TC. In addition, the first time T01 is recorded in the storage unit as a predetermined value in advance and is used in the determination. This predetermined value may be arbitrarily changed.

The sequence after selection of the target button BT is similar to the sequence of the haptic input device 101 according to the first embodiment. The control unit M5 transmits the display signal HS for display control to the display unit M4 to drag the cursor into the target button BT and transmits the drive signal KS for drive control of the drive unit M3 when the cursor is dragged into the target button BT. The display unit M4 receives the display signal HS for display control from the control unit M5 and drags the cursor into the center position of the target button BT and outputs the cursor state as a status signal JS to the storage unit of the control unit M5.

As such, determination on whether or not the movement time difference between the movement time of the first priority button BP1 and the movement time of the second priority button BP2 is equal to or larger than a predetermined first time T01 is made to more reliably drag the cursor into the button intended by a user.

Next, an exemplary control operation of the control unit M5 will be described with reference to FIG. 5.

For example, when the manipulation unit 1 is manipulated, and the output signal OS of the detection unit M2 is received, the cursor is moved as much as the (b)th movement direction distance vector Vb from the original cursor position OCa where the cursor exists before the manipulation to the cursor movement destination position TCb as shown in FIG. 5. In addition, the movement time $T_{41}$ to the button B4 is computed based on the button distance vector $D_{b4}$ from the original cursor position OCa to the button B4 and the projection component $V_{b4}$ to the button distance vector $D_{b4}$ of the movement direction distance vector Vb. Similarly, the movement time $T_{51}$ to the button B5 is computed based on the projection component $V_{b5}$ and the button distance vector $D_{b5}$ of the button B5, and the movement time $T_{61}$ to the button B6 is computed based on the projection component $V_{b6}$ and the button distance vector $D_{b6}$ of the button B6.

The movement times $T_{41}$, $T_{51}$, and $T_{61}$ are compared with each other, and the button B4 having the shortest computed movement time may be determined and selected as the target button BT. However, as shown in FIG. 5, the button B5 having a similar directivity and a similar distance is likely determined as the target button. In this regard, the button B4 having the shortest computed movement time is selected as a first priority button PB1, and the button B5 having the next shortest computed movement time is selected as a second priority button PB2. In addition, it is determined whether or not the movement time difference between the movement times $T_{41}$ and $T_{51}$ is equal to or greater than a predetermined first time T01.

For example, in a case where the button B5 is not present, the button B4 is selected as the first priority button PB1, and the button B6 is selected as the second priority button PB2, the movement time difference between the movement times $T_{41}$ and $T_{61}$ is equal to or greater than a predetermined first time T01. Therefore, the button B4 is determined and selected as the target button BT. However, since the movement time difference between the movement times $T_{41}$ and $T_{51}$ is not equal to or greater than a predetermined first time T01, the target button BT is not selected, the cursor dragging manipulation is not performed, and manipulation of the manipulation unit 1 is awaited.

Then, as the manipulation unit 1 is manipulated again, as shown in FIG. 5, the cursor is moved from the original cursor position OCb (TCb) where the cursor is located before the manipulation to the cursor movement destination position TCc as much as the (c)th movement direction distance vector Vc. In the same sequence, the movement time $T_{42}$ to the button B4 is computed based on the projection component $V_{c4}$ and the button distance vector $D_{c4}$ of the button B4, the movement time $T_{52}$ to the button B5 is computed based on the projection component $V_{c5}$ and the button distance vector $D_{c5}$ of the button B5, and the movement time $T_{62}$ to the button B6 is computed based on the projection component $V_{c6}$ and the button distance vector $D_{c6}$ of the button B6.

The movement times $T_{42}$, $T_{52}$, and $T_{62}$ are compared with each other, and the button B4 having the shortest computed movement time is selected as a first priority button PB1 again, and the button B5 having the next shortest computed movement time is selected as a second priority button PB2. Since the movement time difference between the movement times $T_{41}$ and $T_{51}$ is equal to or greater than a predetermined first time T01, the button B4 is determined and selected as the target button BT, and then, the cursor is dragged into the button B4 which is the target button BT.

As a result, in the haptic input device 102 according to the invention, in a case where the time difference between the movement time of the first priority button BP1 having the shortest computed movement time and the movement time of the second priority button BP2 having the next shortest computed movement time is equal to or greater than a predetermined first time T01, the first priority button PB1 is selected as the target button BT. Therefore, the time differences between compared buttons are recognized, and the button having the short movement time can be reliably selected as the target button BT. As a result, the cursor is not simply moved to the neighboring button, but the cursor can be reliably dragged into the button intended by a user.

Third Embodiment

Figure 6:
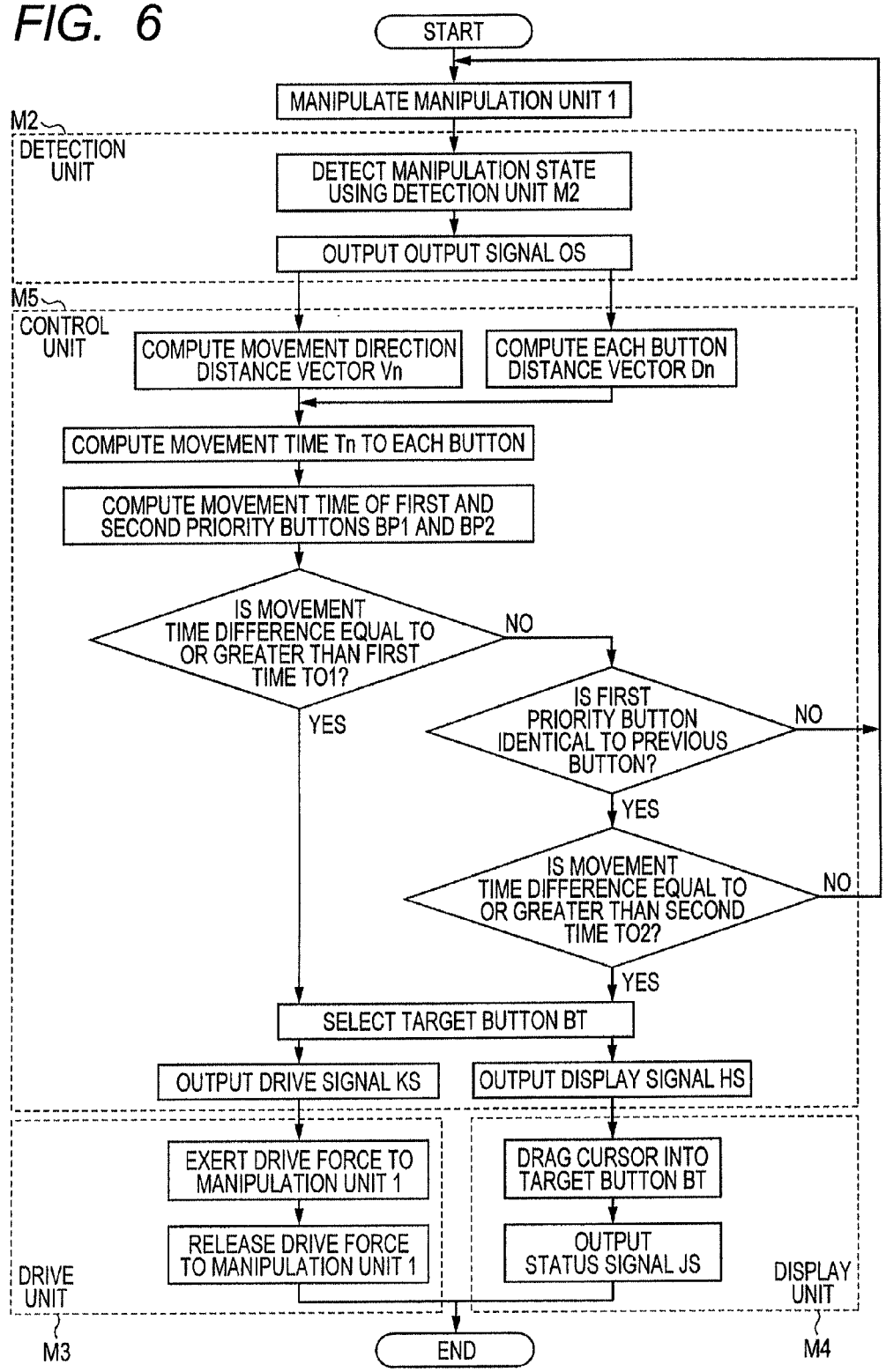
FIG. 6 is a flowchart illustrating a control method in the haptic input device according to a second embodiment of the invention.
Figure 7:
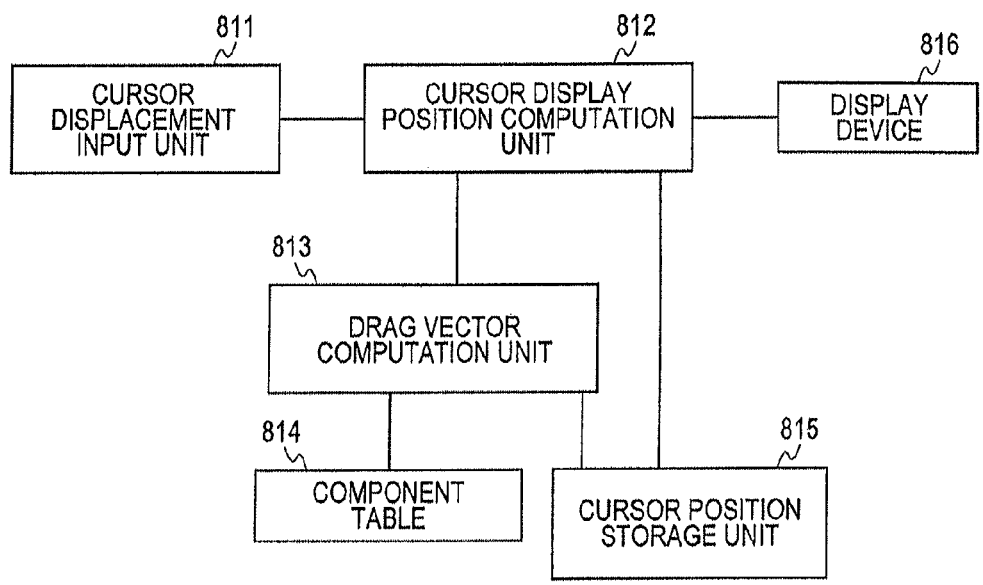
FIG. 7 is a diagram illustrating an exemplary configuration 1 of the related art.
Figure 8:
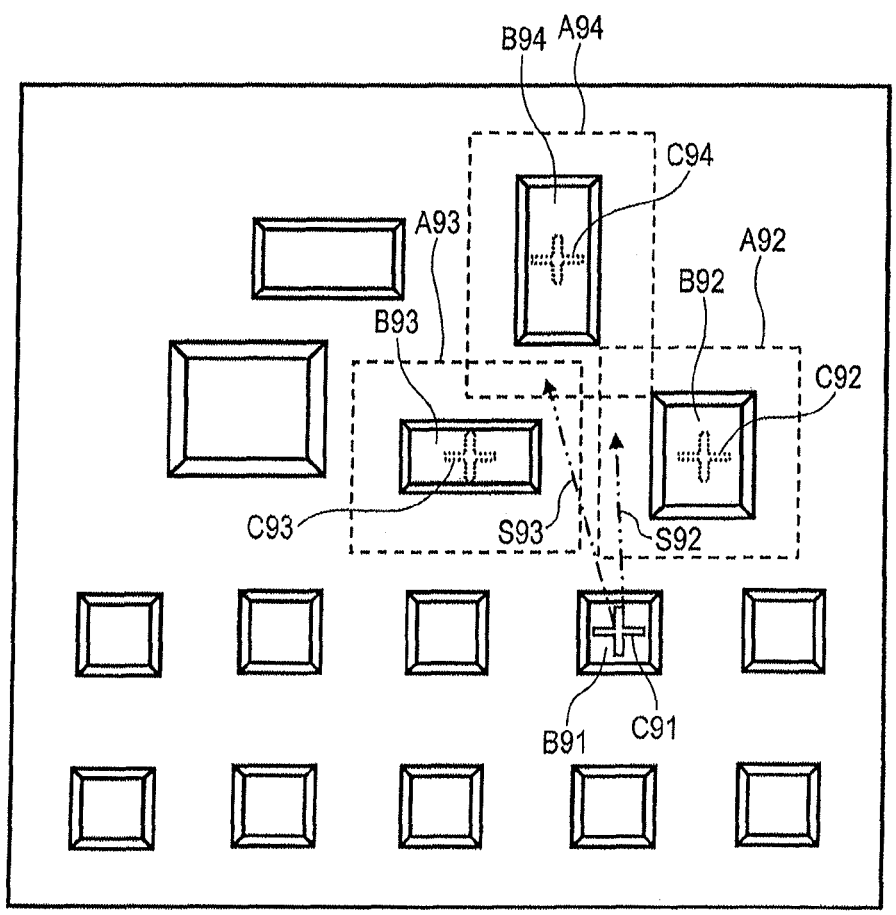
FIG. 8 is a configuration diagram illustrating problems in the cursor drag-in operation in an exemplary configuration 1 of the related art.

FIG. 6 is a flowchart illustrating a control method in the haptic input device 103 according to a third embodiment of the invention. The haptic input device 103 according to the third embodiment of the invention is different from the haptic input device 101 according to the first embodiment in the control method. In the third embodiment, like reference numerals denote like elements as in the first embodiment, and description thereof will not be repeated.

In the control method of the haptic input device 103 according to the third embodiment of the invention, first, as the manipulation unit 1 is manipulated, the detection unit M2 detects a manipulation state of the manipulation unit 1 and outputs the output signal OS to the control unit M5 as shown in FIG. 6.

Then, the control unit M5 receives the output signal OS, computes the movement direction distance vector Vn based on the output signal OS of the manipulation state, the cursor position information from the storage unit, and the like, and computes each button distance vector Dn based on the button position information, the cursor position information from the storage unit, and the like. In addition, the movement time Tn to each button is computed using the movement direction distance vector Vn and each button distance vector Dn, and the movement times of each button are compared, so that the button having the shortest computed movement time is selected as the first priority button PB1, and the button having the next shortest computed movement time is selected as the second priority button PB2. In this case, the position information on the cursor movement destination and the first movement time J01 which is the movement time of the first priority button BP1 are recorded in the storage unit. Such recording is rewritten whenever the computation is performed.

Then, in a case where the movement time difference between the movement time of the first priority button BP1 and the movement time of the second priority button BP2 is equal to or greater than a predetermined first time T01, the control unit M5 determines and selects the first priority button BP1 as the target button BT.

Otherwise, in a case where the movement difference is not equal to or greater than a predetermined first time T01, it is determined whether or not the immediately previous first priority button is identical to the present first priority button again. As a result of this determination, if it is determined that both buttons are not identical, the target button BT is not selected, the cursor dragging manipulation is not performed, and the manipulation of the manipulation unit 1 is awaited.

Otherwise, if it is determined that the immediately previous first priority button is identical to the present first priority button, the time difference between the first movement time J01 which is the movement time of the immediately previous first priority button and the second movement time J02 which is the movement time of the present first priority button is obtained. If the movement time difference between the first and second movement times J01 and J02 is equal to or greater than a predetermined second time T02, the present first priority button is selected as the target button BT. Otherwise, if the movement time difference between the first and second movement times J01 and J02 is not equal to or greater than a predetermined second time T02, the target button BT is not selected, the cursor dragging manipulation is not performed, and the manipulation of the manipulation unit 1 is awaited.

Since the target button BT is not selected, and the cursor dragging manipulation is not performed, as a user manipulates the manipulation unit 1 again, the movement times Tn to each button are computed in a similar sequence, and it is determined whether or not the movement time difference between the movement time of the first priority button BP1 and the movement time of the second priority button BP2 is equal to or greater than a predetermined first time T01. In addition, it is determined whether or not the time difference between the first and second movement times J01 and J02 is equal to or greater than a predetermined second time T02.

The target button BT is selected by repeating this sequence. However, in a case where the movement time Tn to each button is computed, the position of the cursor manipulated at the previous time recorded in the storage unit is computed as the original cursor position OC, and the position of the cursor manipulated in the present time is computed as the cursor movement destination position TC. In addition, the first time T01 and the second time T02 are recorded in the storage unit as predetermined values in advance and then used in determination. These predetermined values may be arbitrarily changed.

As such, determination on whether or not the movement time difference between the movement time of the first priority button BP1 and the movement time of the second priority button BP2 is equal to or greater than a predetermined first time T01 is to more reliably drag the cursor into the button intended by a user. In addition, determination on whether or not the time difference between the first and second movement times J01 and J02 is equal to or greater than a predetermined second time T02 is to determine whether or not the first priority button BP1 reliably approaches the target button BT in the direction intended by a user and to more reliably drag the cursor into the button intended by a user.

The sequence after the target button BT is selected is similar to the sequence of the haptic input device 101 according to the first embodiment. The control unit M5 transmits the display signal HS for display control to the display unit M4 to drag the cursor into the target button BT and transmits the drive signal KS for drive control of the drive unit M3 when the cursor is dragged into the target button BT. The display unit M4 receives the display signal HS for display control from the control unit M5, drags the cursor into the center position of the target button BT, and outputs the cursor state as the status signal JS to the storage unit of the control unit M5.

As a result, in the haptic input device 103 according to the invention, in a case where the time difference between the movement time of the first priority button BP1 having the shortest computed movement time and the movement time of the second priority button BP2 having the next shortest computed movement time is equal to or greater than a predetermined first time T01, the first priority button PB1 is selected as the target button BT. Therefore, the time differences between the compared buttons are recognized, and it is possible to reliably select the button having the short movement time as the target button BT. As a result, the cursor is not simply moved to the neighboring button, but the cursor can be more reliably dragged into the button intended by a user.

In a case where the time difference between the first movement time J01 to the first priority button selected by manipulation the manipulation unit 1 and the second movement time J02 of the present first priority button selected by manipulating the manipulation unit 1 at the next time as the first priority button similar to the immediately previous button is equal to or greater than a predetermined second time T02, the first priority button is selected as the target button BT. Therefore, the first priority button reliably approaches the target button BT in the direction intended by a user. As a result, the cursor is not simply moved to the neighboring button, but it is possible to more reliably drag the cursor into the button intended by a user.

The invention is not limited to the embodiments described above, but may be variously modified, for example, as described below. Those modifications are to be considered within the technical scope of the invention.

Although the trackball 11 is used in the manipulation unit 1 in the aforementioned embodiment, a stick-shaped manipulation unit having a pivot lever may be used.

Although the electromagnetic brake 13 is used in the drive unit M3 in the aforementioned embodiment, a drive unit using an electric motor and the like may be used.

Although two optical type sensors 12A and 12B are used in the detection unit M2 in the aforementioned embodiment, a rotary type encoder, a variable resistor, and the like may be used.

Although a noisy metallic sound is generated using the impact of strongly pressing the friction member 13B of the electromagnetic brake 13 to the surface of the ball body 41 in the aforementioned embodiment, the sound may be generated using a loudspeaker, a sound generating source, or the like.

Although the display unit M4 transmits the output signal regarding the cursor state to the storage unit of the control unit M5 in the aforementioned embodiment, the cursor state may be stored in the storage unit when the control unit M5 transmits the display signal HS to the display unit M4.

The invention is not limited to the embodiments described above, but may be variously modified without departing from the spirit and scope of the invention.

It should be understood by those skilled in the art that various modifications, combinations, sub-combinations and alterations may occur depending on design requirements and other factors insofar as they are within the scope of the appended claims of the equivalents thereof.

What is claimed is:
1. A haptic input device comprising:
a manipulation unit manipulated by a user;
a detection mechanism that detects a manipulation state of the manipulation unit;
a drive mechanism that exerts a drive force to the manipulation unit;
a display that displays a cursor and a plurality of buttons; and
a control unit that performs display control of the cursor based on an output signal of the detection mechanism and drive control of the drive mechanism,
wherein, when the output signal of the detection mechanism is received by manipulating the manipulation unit,
a distance vector from an original cursor position where the cursor exists before the manipulation to a cursor movement destination position where the cursor moves after the manipulation is set to a movement direction distance vector,
a distance vector from the original cursor position to each button position of a plurality of buttons is set to a button distance vector, and
the control unit computes the movement direction distance vector and each button distance vector, computes movement times to a plurality of the buttons using the movement direction distance vector and a plurality of the button distance vectors, and determines a button having the shortest movement time as a target button intended by a user, so as to perform display control to drag the cursor onto the target button, wherein, when the output signal of the detection mechanism is received by manipulating the manipulation unit, in a case where a time difference between the movement time of the first priority button having the shortest computed movement time and the movement time of the second priority button having the next shortest computed movement time is equal to or greater than a predetermined first time, the control unit selects the first priority button as the target button, wherein the computed movement time to the first priority button is selected as a first movement time by manipulating the manipulation unit, wherein, when the first priority button selected by manipulating the manipulation unit at the next time is identical to the first priority button at the immediately previous time, the computed movement time to the selected first priority button is selected as a second movement time, and wherein the control unit selects the first priority button as the target button in a case where a time difference between the first movement time and the second movement time is equal to or greater than a predetermined second time.

2. The haptic input device according to claim 1, wherein, when the cursor is dragged onto the target button, the control unit performs drive control of the drive mechanism such that the drive mechanism exerts a drive force to the manipulation unit, and a sound is generated as the drive force is exerted.

3. The haptic input device according to claim 2, wherein the manipulation unit has a trackball, and the drive mechanism has an electromagnetic brake.

* * * * *